United States Patent [19]

Gresham

[11] Patent Number: 4,995,775

[45] **Date of Patent: * Feb. 26, 1991**

[54] TIE DOWN APPARATUS FOR WHEELCHAIR

[76] Inventor: Gerald L. Gresham, 30800 Wixom Rd., Wixom, Mich. 48096

[ * ] Notice: The portion of the term of this patent subsequent to Dec. 12, 2006 has been disclaimed.

[21] Appl. No.: 486,818

[22] Filed: Mar. 1, 1990

[51] Int. Cl.[5] .................................... B60P 3/06

[52] U.S. Cl. .................................... 410/10; 410/12

[58] Field of Search .................... 410/7, 9, 10, 11, 19, 410/22, 23

[56] References Cited

U.S. PATENT DOCUMENTS 3,955,847 5/1976 Schiowitz .
4,060,271 11/1977 Williams .
4,103,934 8/1978 Arnholt et al. .................... 410/7 X
4,257,644 3/1981 Stephens .
4,389,056 6/1983 Tenniswood .
4,427,210 1/1984 Wevers .
4,492,403 1/1985 Blomgren .
4,623,289 11/1986 Apostolos .
4,730,964 3/1988 Joyner .................................. 410/23
4,886,403 12/1989 Gresham .............................. 410/10

FOREIGN PATENT DOCUMENTS 2827377 6/1978 Fed. Rep. of Germany .

*Primary Examiner*—Robert P. Olszewski
*Assistant Examiner*—Scott L. Lowe
*Attorney, Agent, or Firm*—Ian C. McLeod

[57] ABSTRACT

An improved wheelchair (100) tie down apparatus for use in a vehicle is described. Front attachment (A) and rear attachment (B) hold the wheelchair in the vehicle. The rear attachment is secured to the floor (200) by joined fixed length link (3), hinges (24 and 27) and tange (22), cross member (20*c*) between upright members (20), rear bar (26) and arms (28) secured to the rear axle (106) of the wheelchair. The tie down provides a rigid connection of the wheelchair to the floor of the vehicle.

19 Claims, 3 Drawing Sheets

TIE DOWN APPARATUS FOR WHEELCHAIR

BACKGROUND OF THE INVENTION

1. Summary of the Invention

Figure 1:
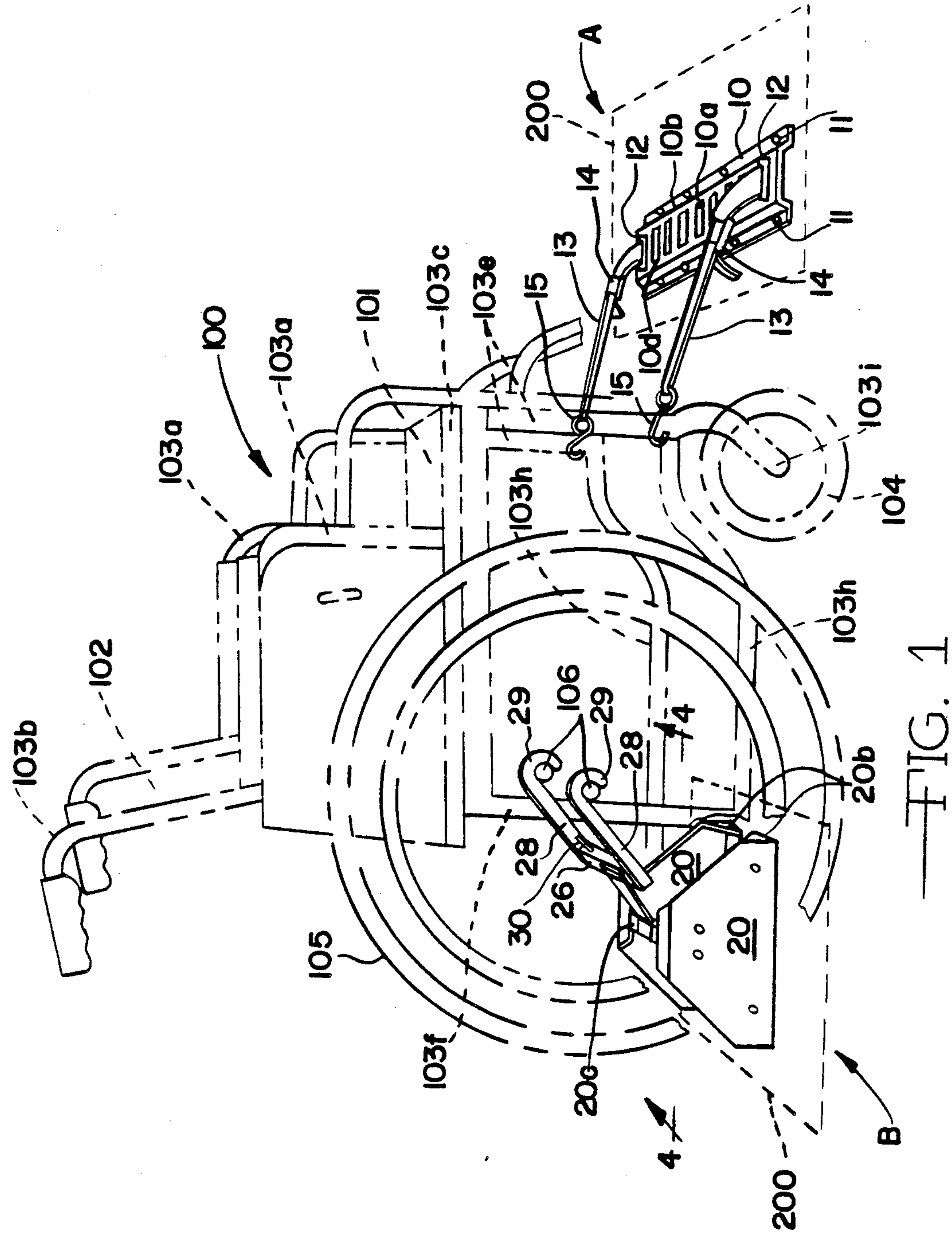

The present invention relates to an improved tie down apparatus for securing a wheelchair in a vehicle. In particular, the present invention relates to a tie down apparatus which has a forward tie down for securing the wheelchair to the floor and a fixed length connection link joined to a floor support means which is secured to the floor of the vehicle at the rear of the wheelchair which holds the wheelchair.

2. Prior Art

The prior art has described various types of hold down devices. Illustrative are U.S. Pat. Nos. 3,955,847 to Schiowitz; 4,060,271 to Williams; 4,257,644 to Stephens; 4,389,056 to Tenniswood; 4,427,210 to Wevers; 4,492,403 to Blomgren et al, 4,623,289 to Apostolos, and German Pat. Nos. 615,830 and 2,827,377. All of the prior art devices are relatively complicated, do not adequately secure the wheelchair to the floor of the vehicle because of the use of flexible and sometimes elastic belts for holding the wheelchair against forward movement relative to the floor and/or are difficult to use for securing the wheelchair to the floor of the vehicle. Belts or chains as tie downs are relatively long and require considerable room in the vehicle thus reducing the number of wheelchairs which can be carried in a given space in the vehicle. Further the lap belts for these prior art tie down apparatus are not secured directly to the floor of the vehicle in a metal to metal connection.

OBJECTS

It is therefore an object of the present invention to provide a tie down apparatus for a wheelchair wherein the device occupies a minimum amount of room in the vehicle and provides an inflexible and inelastic rear connection link to the floor of the vehicle. Further it is an object of the present invention to provide a tie down apparatus which will not slip in the event the vehicle stops suddenly such as in an accident. Further still it is an object of the present invention to provide an apparatus which secures the lap belts to the floor of the vehicle in a direct connection. Further still, it is an object of the present invention to provide a tie down apparatus which is relatively simple and inexpensive to construct. These and other objects will become increasingly apparent by reference to the following description and the drawings.

In THE DRAWINGS

FIG. 1 is a side perspective view of the front and rear attachments A and B mounted on a wheelchair 100 and secured to the floor 200 of a vehicle.

Figure 2:
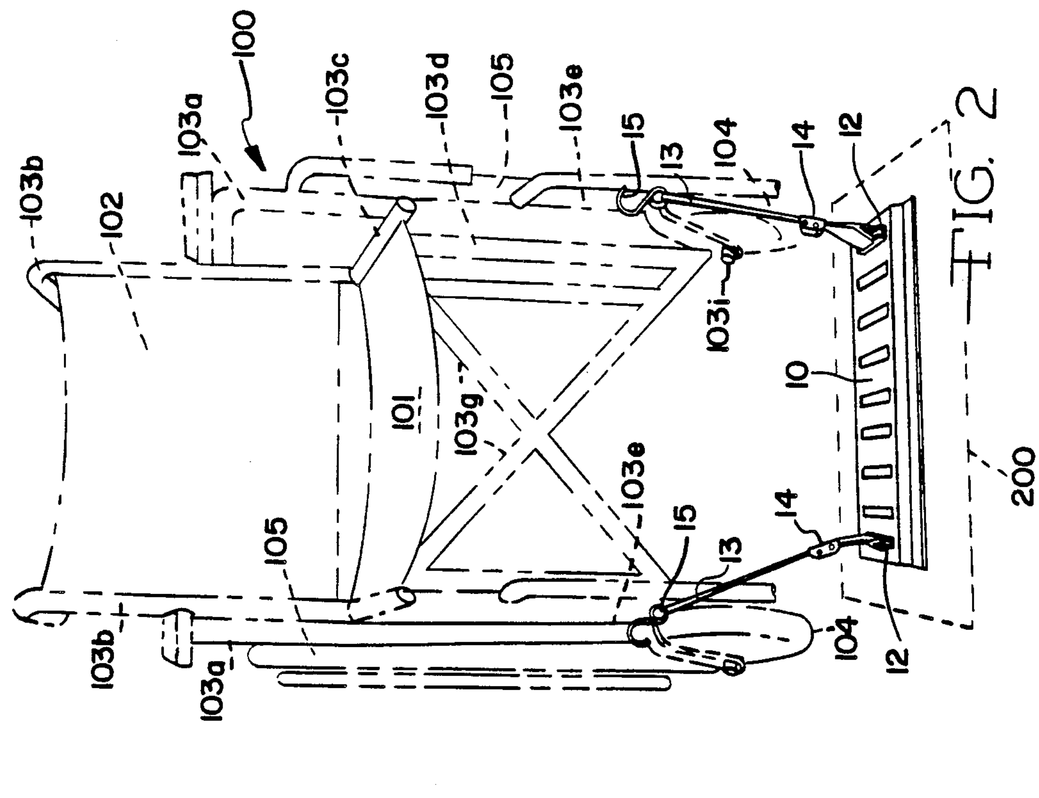

FIG. 2 is a perspective front view of the wheelchair 100 showing the front attachment A as in FIG. 1 and particularly showing snap connectors 12, belts 13, buckles 14 and front bar 10 for tying down the front of the wheelchair 100 to the floor 200 of the vehicle.

Figure 3:
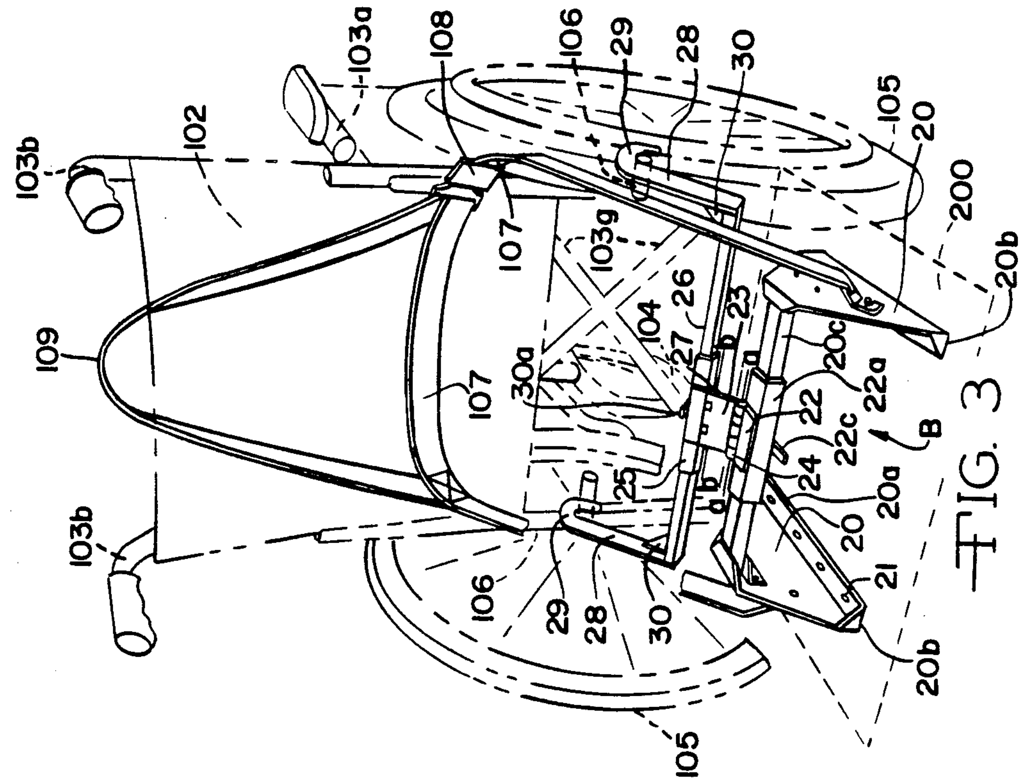

FIG. 3 is a perspective rear view of the wheelchair 100 showing the rear attachment B of the tie down apparatus as in FIG. 1 and particularly showing a tube 22*a*, supported cross member 20*c* between upright members 20 secured to the floor 200, tang 22, connection link 23, rear bar 26 and arms 28 for tying down the rear of the wheelchair 100 to the floor 200 of the vehicle.

Figure 4:
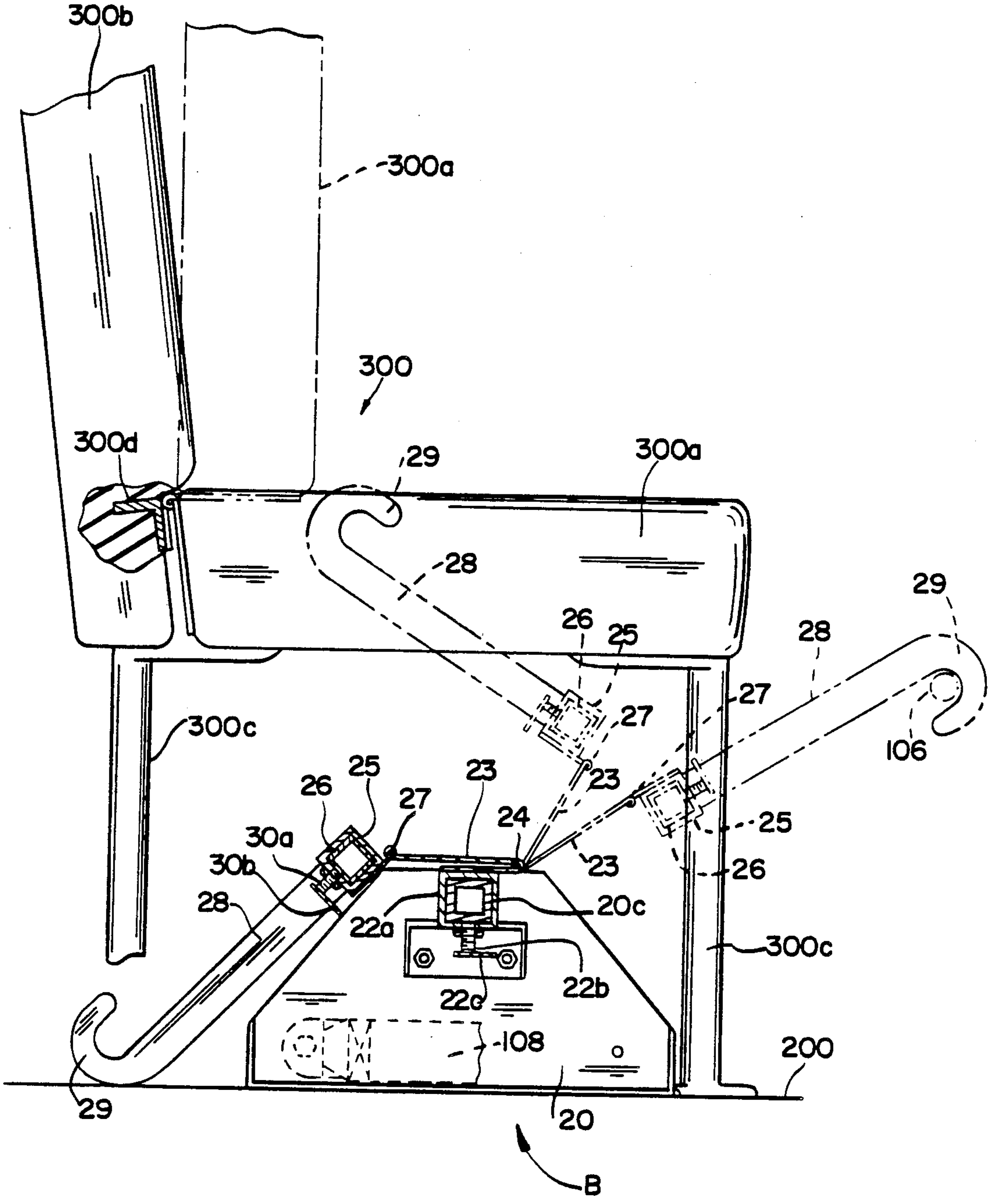

FIG. 4 is a front cross-sectional view along line 4—4 of FIG. 1 showing the folding of the hooks 28 on hinges 24 and 27 under a seat 300.

GENERAL DESCRIPTION

The present invention relates to an apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises: a front attachment means for securing the front of the wheelchair to the floor; and a rear attachment means for securing the rear of the wheelchair to the floor including (i) a rear bar means which can mount on the rear of the frame means of the wheelchair; (ii) a fixed length foldable connection link means formed of rigid members and having opposed ends with a cross member means mounted horizontally at one of the ends and attached to the rear bar means at the other end and with a hinge means intermediate the ends of the link means which folds on a horizontal axis; and (iii) a floor support means with the cross member means secured between upright member means which are secured to the floor, wherein the cross member means, link means and rear bar means hold the wheelchair in position when the wheelchair is pulled in a forward direction and secured by the front attachment means.

In particular the present invention relates to an apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises: a front attachment means for securing the front of the wheelchair to the floor with a connection means between the front of the wheelchair and the floor which pulls the wheelchair in a forward direction; and a rear attachment means for securing the rear of the wheelchair to the floor including (i) a rear bar means which can mount on the rear of the frame means; (ii) a fixed length foldable connection link means formed of rigid members and having opposed ends with a cross member means mounted slideably and horizontally at one of the ends and attached to the rear bar means at the other end and with a hinge means intermediate the ends of the link means which folds on a horizontal axis; and (iii) a floor support means with the cross member means secured between upright member means, wherein the hook means, link means and rear bar means hold the wheelchair in position when the wheelchair is pulled in the forward direction and secured by the front attachment means and are dimensioned to be foldable on the hinge means under a foldable seat of the vehicle when not in use.

Preferably the front and rear attachment means are made of metal except for the front belts. Fiber reinforced plastics might be used for the front and rear attachment means for weight reduction, but are not preferred.

SPECIFIC DESCRIPTION

FIGS. 1 to 3 show a conventional wheelchair 100 in broken lines including a seat 101 and backrest 102 supported by conventional frame members 103*a* to 10*h*. Frame members 103*e* are vertically oriented and support the small front wheels 104 on axles 103*i*. Frame members 103*f* support the larger rear wheels 105 on axles 106. The wheelchair 100 is to be secured to the floor 200 of a vehicle (not shown).

Mounted on the floor 200 is a front plate 10 secured in place by means of bolts 11 through openings (not shown) in plate 10 and through the floor 200. The plate 10 is provided with multiple openings 10*a* in a raised portion 10*b* of the front plate 10. Snap connectors 12 are mounted in two of the openings 10*a* in the plate 10. Belts 13 are attached to connectors 12. Buckles 14 are provided on the belts 13 for tensioning the belts 13. Hooks 15 are attached to frame members 103*e*. Buckles 14 are of a conventional rachet type and act to tension and untension the belt 13 between the hooks 15 and connectors 12. The plate 10, connectors 12, belts 13, buckles 14 and hooks 15 provide a front attachment A for the wheelchair 100 to the floor 200.

Rear upright members 20 are mounted on floor 200 by means of bolts 21 (FIG. 3) through openings (not shown) in angle portion 20*a* of members 20. Gussets 20*b* (FIG. 3) are provided to secure the angle portion 20*a*. A cross member 20*c* is mounted between the upright members 20. A tubular member 22*a* on tang 22 is mounted around the cross member 20*c* so as to be positionable along the cross member 20*c*. The tubular member 22*a* is secured on cross member 20*c* by means of a threaded bolt 22*b* with handle 22*c* as shown in more detail in FIG. 4 and described hereinafter. Tang 22 is connected to link 23 by a first piano hinge 24. The first piano hinge 24 pivots on an essentially horizontal axis a—a. The link 23 is connected to a tubular extension 25 around a bar 26 through a second hinge 27 which pivots on an essentially horizontal axis b—b. Spaced apart arms 28 with curved portions 29 are mounted on the bar 26 and connect around axles 106. Gussets 30 support the arms 28 on the bar 26. Lap belts 107 are secured to the upright members 20 with a three point buckle 108 adjacent the hip. Shoulder belt 109 is connected to buckle 108. The rear attachment B includes the upright members 20, cross member 20*c*, tubular member 22*a*, tang 22, link 23, tubular extension rear bar 26, arms 28 and curved portions 29.

FIG. 4 shows a seat 300 mounted over the rear attachment B. The seat 300 includes a horizontal portion 300*a* and an upright portion 300*b* mounted on a frame 300*c* by means of a folding hinge 300*d*. The horizontal portion 300*a* folds upward as shown by the dotted lines so that the wheelchair 100 can be positioned in the vehicle. With the horizontal portion 300*a* folded, the arm 28 is in the position for attachment to the axle 106 as shown by the dotted lines. The arm 28 folds to a position where the hook 29 is on the floor 200 when not in use as shown by the dotted lines on the left of FIG. 4. In the center of FIG. 4, the arm 28 is shown in an intermediate position in dotted lines.

The tube 22*a* is secured to the cross member, 20*c* by means of threaded member 22*b* which is turned by handle 22*c* against cross member 20*c* to secure the tube 22*a* in position. Lever arm 20*b* is used to turn threaded member 30*a* against the rear bar 26 to secure the tube 25 in position. When the threaded members 22*b* and 30*a* are loosened, the tubes 22*a* and 25 find a position depending upon the portion of the wheelchair 100 relative to the cross member 20*c* and the rear bar 26.

In operation, the attachments A and B are mounted on the wheelchair 100 and floor 200. The hooks 29 are mounted over rear axle 106. The belts 13 are then tightened by buckles 14 so that the wheelchair is secured to the floor 200 of the vehicle.

The short length including the tang 22, link 23 and with hinges 24 and 27 allows the upright members 20 to be close to the rear of the wheelchair. This combination allows close spacing of additional wheelchairs in the vehicle. This combination of attachments A and B eliminates the need for a flexible belt and buckle at the rear of the wheelchair which is conventional in the prior art. The combination allows the wheelchair to be very rapidly (one minute or less) secured in the vehicle. The occupant can also be removed from the chair by opening buckle 108 on belts 107 and 109 without removing the wheelchair from the vehicle.

It is intended that the foregoing description be only illustrative of the present invention and that the present invention be limited only by the hereinafter appended claims.

I claim:

1. An apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises:

(a) a front attachment means for securing the front of the wheelchair to the floor; and (b) a rear attachment means for securing the rear of the wheelchair to the floor including (i) a rear bar means which can mount on the rear of the frame means of the wheelchair; (ii) a fixed length foldable connection link means formed of rigid members and having opposed ends with a cross member means mounted horizontally at one of the ends and attached to the rear bar means at the other end and with a hinge means intermediate the ends of the link means which folds on a horizontal axis; and (iii) a floor support means with the cross member means secured between upright member means which are secured to the floor, wherein the cross member means with the floor support means, link means and rear bar means hold the wheelchair in position when the wheelchair is pulled in a forward direction and secured by the front attachment means.

2. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:

(a) a front attachment means for securing the front of the wheelchair to the floor with a connection means between the front of the wheelchair and the floor which pulls the wheelchair in a forward direction; and (b) a rear attachment means for securing the rear of the wheelchair to the floor including (i) a rear bar means with spaced apart arm means having curved ends which mount around the rear axle means of the wheelchair; (ii) a fixed length foldable connection link means formed of rigid members and having opposed ends with a cross member means mounted horizontally at one end and attached to the rear bar means at the other end with a hinge means intermediate the ends of the link means which folds on a horizontal axis; and (iii) a floor support means with the cross member means secured between upright member means which are secured to the floor, wherein the cross member means with the floor support means, link means and rear bar means hold the wheelchair in position when the wheelchair is pulled in the forward direction and secured by the front attachment means.

3. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:

(a) a front attachment means for securing the front of the wheelchair to the floor with a connection means between the front of the wheelchair and to the floor which pulls the wheelchair in a forward direction; and (b) a rear attachment means for securing the rear of the wheelchair to the floor including (i) a rear bar means with spaced apart arm means having curved ends which mount around the rear axle means of the wheelchair; (ii) a fixed length foldable connection link means formed of rigid members and having opposed ends with a cross member means mounted horizontally at one end and attached to the rear bar means at the other end and with a piano type hinge intermediate the ends of the link means which folds on a horizontal axis; and (iii) a floor support means with the cross member means secured between two upright member means which are secured to the floor, wherein the cross member means with the floor support means, link means and rear bar means hold the wheelchair in position when the wheelchair is pulled in the forward direction and secured by the front attachment means.

4. An apparatus for securing a wheelchair to the floor of a vehicle wherein the wheelchair has a front and a rear and includes a frame means with front posts mounting spaced apart front wheels on front axle means and rear axle means mounted on the frame means supporting spaced apart rear wheels behind the front wheels which comprises:

(a) a front attachment means for securing the front of the wheelchair to the floor with a connection means between the front of the wheelchair and the floor which pulls the wheelchair in a forward direction; and (b) a rear attachment means for securing the rear of the wheelchair to the floor including (i) a rear bar means which can mount on the rear of the frame means; (ii) a fixed length foldable connection link means formed of rigid members and having opposed ends with a cross member means mounted slideably and horizontally at one of the ends and attached to the rear bar means at the other end and with a hinge means intermediate the ends of the link means which folds on a horizontal axis; and (iii) a floor support means with the cross member means secured between upright member means, wherein the cross-member means with the floor support means, link means and rear bar means hold the wheelchair in position when the wheelchair is pulled in the forward direction and secured by the front attachment means and are dimensioned to be foldable on the hinge means under a foldable seat of the vehicle when not in use.

5. The apparatus of claim 4 wherein axle engaging means are provided on the rear bar means which mount around the rear axle means.

6. The apparatus of claim 4 wherein the hinge means on the connection link means is a piano type hinge.

7. The apparatus of claim 4 wherein seat belts are attached to the upright member means so as to extend around the waist of an occupant of the wheelchair.

8. The apparatus of claim 4 wherein there are two of the hinge means which are spaced apart on the connection link means.

9. The apparatus of claim 8 wherein the hinge means are piano type hinges.

10. An apparatus for securing a wheelchair to the floor of a vehicle wherein the wheelchair has a front and a rear and includes a frame means with two vertically oriented front posts supporting spaced apart relatively small front wheels on front axle means and horizontally oriented rear axle means mounted on the frame means supporting relatively large spaced apart rear wheels behind the front wheels which comprises:

(a) a front attachment means for securing the front of the wheelchair to the floor with a belt means connected to the front of the wheelchair and the floor to pull the wheelchair in a forward direction; and (b) a rear attachment means for securing the rear of the wheelchair to the floor including (i) a rear bar means such with spaced apart arm means having curved ends which mount around the rear axle means; (ii) a fixed length foldable connection link means formed of rigid members and with a cross member means mounted horizontally at one end and attached to the rear bar means at the other end with a hinge means intermediate the ends of the link means which folds on a horizontal axis; and (iii) a floor support means which is attached to hinge means by means of the cross member means which is secured between upright member means, wherein the cross-member means with the floor support means, link means and rear bar means hold the wheelchair in position when the wheelchair is pulled in the forward direction and secured by the front attachment means and are dimensioned to be foldable on the hinge means under a foldable seat of the vehicle when not in use.

11. The apparatus of claim 10 wherein the curved ends of the arm means mount around an upper portion of the axle means.

12. The apparatus of claim 11 wherein the hinge means is a piano type hinge.

13. The apparatus of claim 10 wherein seat belts are attached to the upright member means so as to extend around the waist of an occupant of the wheelchair.

14. The apparatus of claim 10 wherein there are two of the hinge means which are spaced apart on the connection link means.

15. The apparatus of claim 14 wherein seat belts are attached to the upright member means so as to extend around the waist of an occupant of the wheelchair.

16. The apparatus of claim 15 wherein the curved ends of the arm means on the rear bar mėans mount around an upper portion of the axle means.

17. The apparatus of claim 16 wherein there are two piano type hinges on the connection link means.

18. The apparatus of claim 10 wherein the link means is slideably mounted horizontally on the cross member 19. The apparatus of claim 18 wherein there are two piano type hinges on the connection link means.

* * * * *

UNITED STATES PATENT AND TRADEMARK OFFICE

CERTIFICATE OF CORRECTION

PATENT NO. : 4,995,775

DATED : February 26, 1991

INVENTOR(S) : Gerald L. Gresham

It is certified that error appears in the above—identified patent and that said Letters Patent is hereby corrected as shown below:

Title Page, in the Abstract, line 5, "tange" should be --tang--.

Column 3, line 1, "103a to 10h" should be --103a to 103h--.

Column 3, line 63, "arm 20b" should be --arm 30b--.

Column 8, Claim 18, line 2, after "member", --means-- should be inserted.

Signed and Sealed this

Twenty-first Day of July, 1992

*Attest:*

DOUGLAS B. COMER

*Attesting Officer* *Acting Commissioner of Patents and Trademarks*